United States Patent [19]
Pronasko

[11] 3,876,026
[45] Apr. 8, 1975

[54] DIRECTIONALLY DRIVEN AUTOMOBILE

[76] Inventor: Stefan Pronasko, 24391 Los Serranos, South Laguna, Calif. 92677

[22] Filed: Nov. 15, 1973

[21] Appl. No.: 416,020

[52] U.S. Cl.................................. 180/23; 180/52
[51] Int. Cl............................................ B62d 61/10
[58] Field of Search............ 180/21, 23, 42, 52, 11, 180/12, 13, 25 R, 65 R, 24

[56] References Cited
UNITED STATES PATENTS

| | | | |
|---|---|---|---|
| 1,311,726 | 7/1919 | Tesiro.................................. | 180/21 |
| 1,871,734 | 8/1932 | Prins.................................... | 180/21 |
| 2,450,566 | 10/1948 | Schmid................................. | 180/11 |
| 3,174,574 | 3/1965 | Mason................................. | 180/25 R |
| 3,280,931 | 10/1966 | Cahill et al. ........................ | 180/52 |
| 3,330,371 | 7/1967 | Seaman............................... | 180/11 |
| 3,404,746 | 10/1968 | Slay .................................... | 180/23 |
| 3,477,537 | 11/1969 | Plishner............................. | 180/65 R |
| 3,575,250 | 4/1971 | Dykes................................. | 180/11 |

*Primary Examiner*—Kenneth H. Betts
*Attorney, Agent, or Firm*—Pastoriza & Kelly

[57] ABSTRACT

An automobile frame is provided with four independent trailing type caster-camber mounted supporting wheels and a pair of driving wheels pivotally mounted to the frame for arcuate movement to simultaneously drive and enable steering of the vehicle. The driving wheels are within the frame and pivoted at a point ahead of the center of the gravity of the vehicle to exert a force on the frame in a direction corresponding to the orientation of the driving wheels. The driving wheels themselves are mounted on opposite ends of an electric motor rotor shaft, a source of electrical energy being provided in the vehicle for electric motors. The basic design is applicable to automobiles, trucks, buses, and the like.

5 Claims, 4 Drawing Figures

3,876,026

DIRECTIONALLY DRIVEN AUTOMOBILE

This invention relates generally to vehicles and more particularly to a vehicle construction providing a greatly improved driving and steering arrangement.

BACKGROUND OF THE INVENTION

Conventional vehicles, such as automobiles, are usually driven by the rear wheels simulating a condition of a pushing force at the rear portion of the automobile frame. This application of the driving force at this portion of the frame tends towards instability as well as difficulty in steering the vehicle when the front wheels are used as steering wheels. This difficulty results from the plowing or sliding of the wheels on the road surface to obtain the desired direction.

Some automobiles have been designed with front wheel drives in order to overcome the foregoing problems. By providing a front wheel drive, the force on the automobile frame is similar to a pulling force on the frame and greater stability is achieved. On the other hand, steering is somewhat more complicated since the front wheels not only must transmit power or traction to the road but also must be capable of independent turning. Moreover, the front wheels do not apply their driving force along the center line of the vehicle. Actually, instability can result because of the wide space between the driving wheels.

In addition to the foregoing, general characteristics of present day vehicles, most are driven by an internal combustion engine located in the front of the vehicle which necessitates a drive shaft to the rear wheels when a rear wheel drive is provided. Further, in order to accelerate, decelerate, brake the vehicle, and so forth, special transmissions or clutches are necessary as well as braking means in addition to the basic engine power plan.

BRIEF DESCRIPTION OF THE PRESENT INVENTION

The present invention contemplates a novel vehicle construction which overcomes the foregoing problems inherent in present day vehicles, such as automobiles, buses, and the like.

More particularly, in accord with the present invention there is provided a frame as in conventional automobiles but rather than normal axle connected front and rear wheels, there are provided a pair of front and rear wheels which are independently mounted on trailing caster-camber mounts to serve as supporting wheels as opposed to any of them serving as driving wheels for the vehicle frame. Within the frame there is then provided a driving means positioned ahead of the center of gravity of the vehicle between the front and rear pairs of wheels. Means are provided coupling the driving means to the frame for arcuate movement within the frame about a universal pivot point ahead of the driving means so that a driving force is exerted on the frame at the pivot point in the direction of the orientation of the driving means, the trailing type castercamber mounted supporting wheels automatically orienting themselves in a direction parallel to the driving means. By arcuately moving driving means, steering of the vehicle is accomplished.

In accord with the preferred embodiment, there is provided an electric motor with a rotor shaft transversely oriented to the longitudinal axis of the vehicle. First and second driving wheels in turn are mounted to opposite ends of the rotor shaft and are spaced sufficiently close together that no differential between these wheels is necessary when the total driving means is moved within the frame to steer the vehicle.

A source of electrical energy may be provided by batteries or an electric generator in turn driven at a constant RPM by any suitable internal combustion engine or other power source. Control of the acceleration, deceleration, braking and the like can readily be accomplished in the electrical portion of the system so that the generator and engine driving the generator can be operated at a constant speed and thus with great efficiency.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
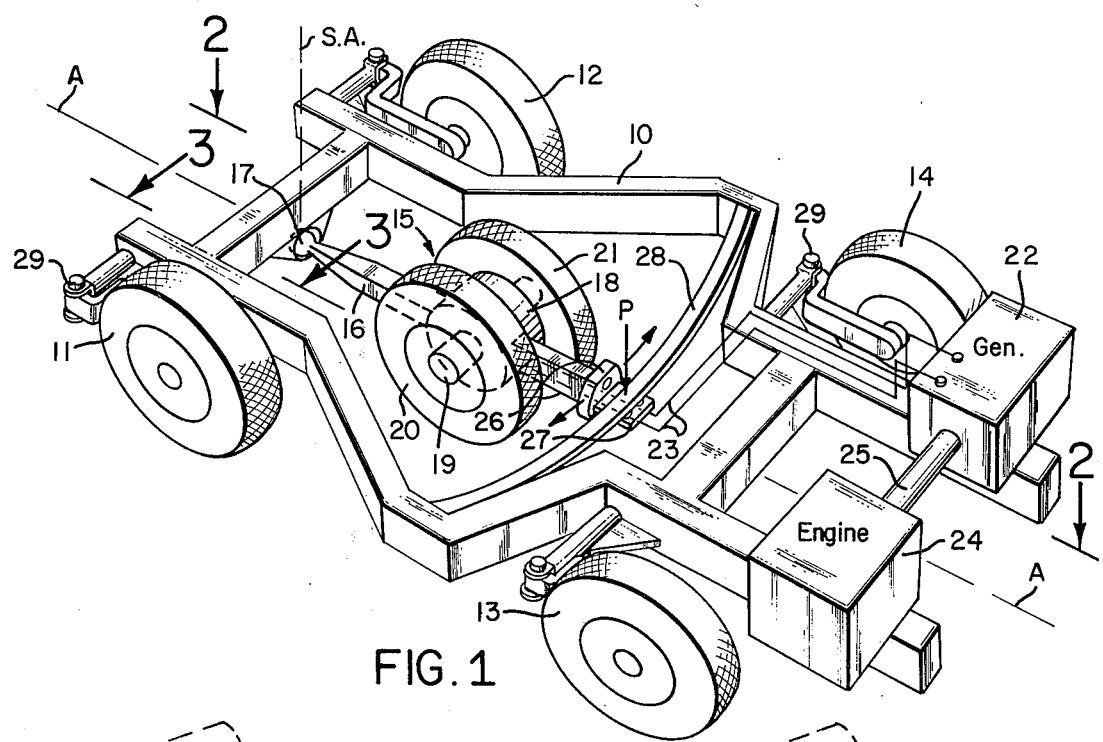
FIG. 1 is a perspective view of the frame portion of the vehicle of this invention showing the basic components making up the improved vehicle.

Referring to FIG. 1, the vehicle includes a frame 10 with front and rear pairs of trailing type caster-camber mounted supporting wheels connected to the frame as indicated at 11, 12 and 13, 14 respectively. A driving means indicated generally by the arrow 15 is coupled to the frame for arcuate movement as by any suitable structure such as member 16 and ball and socket universal joint 17. The arrangement is such that the driving means exerts a driving force on the frame at its pivot point 17 in the direction of orientation of the driving means. In the central position shown in FIG. 1, this orientation is along the direction of the longitudinal axis of the vehicle frame indicated at A—A.

Figure 2:
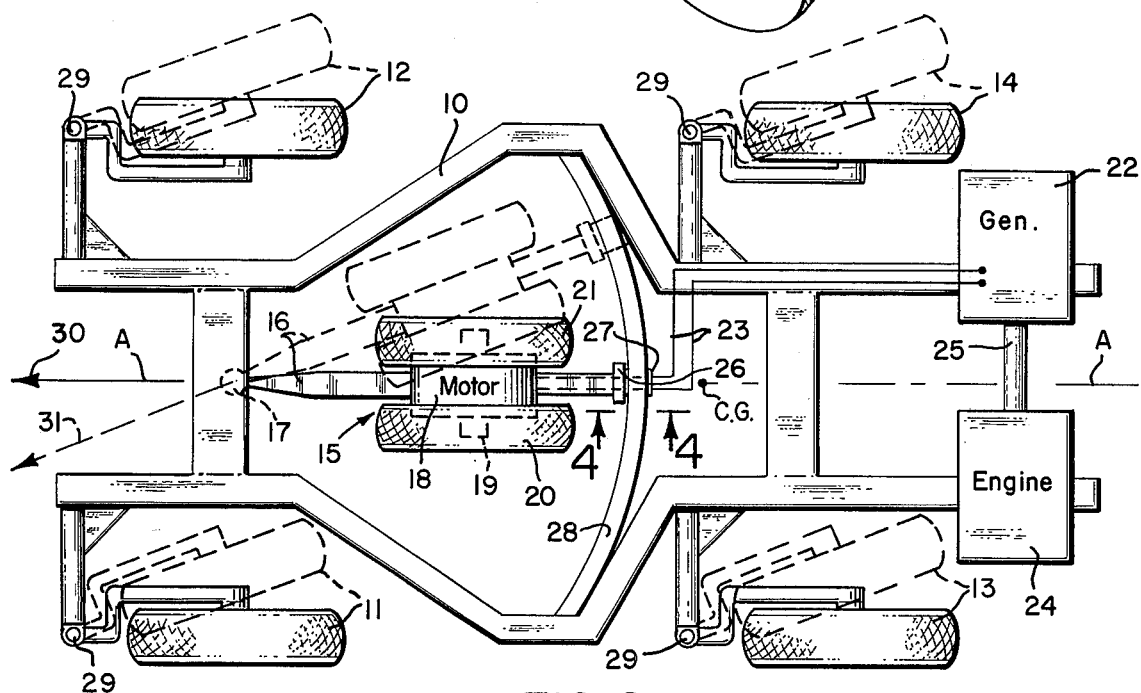
FIG. 2 is a top plan view of the structure of FIG. 1 looking in the direction of the arrows 2—2.

With reference to both FIGS. 1 and 2, the driving means 15 includes an electric d.c. motor 18 having a rotor shaft 19. The motor 18 is mounted on the coupling member 16 with its rotor shaft oriented at right angles to the longitudinal axis of the vehicle. First and second driving wheels 20 and 21, in turn, are mounted directly to the opposite ends of the rotor shaft 19.

As shown on the rear portion of the frame in both FIGS. 1 and 2, a source of electrical energy includes a generator 22 connected to the motor as by power leads 23. In the particular embodiment disclosed, the generator 22 is driven by an internal combustion engine 24 through a coupling shaft 25. However, the source of electrical energy could constitute batteries or a generator as shown driven by any other suitable driving engine or power source, such as a turbine with an isotope heat source.

It will be understood from FIGS. 1 and 2 that the front and rear pairs of trailing type, caster-camber mounted supporting wheels are independently mounted and serve as the basic support for the vehicle itself. In order that the driving wheels 20 and 21 be maintained in a desired traction with the ground to impart a driving force to the frame, there is included a biasing means on the frame coupled to the driving means 15 at a point spaced from the pivot point to exert a downward biasing force on the driving means and thus assure desired traction engagement of the driving wheels with the ground. This biasing arrangement in the example chosen for illustrative purposes applies pressure to the rear portion of the member 16 immediately to the rear of the driving wheels 20 and 21. Thus, as shown in both FIGS. 1 and 2, the rear portion of the coupling member 16 includes an upwardly extending member 26 arranged to be coupled for movement along a transverse arc by the steering wheel for the vehicle. For example, a conventional piston and cylinder with hoses could be connected between the member 26 and frame 10 or between other portions of the structural member 16 and the frame 10 to effect the desired swinging movement for steering. This member 26 includes a rearwardly extending plate 27 positioned to ride immediately beneath a biasing band spring 28. The spring 28 has its opposite ends connected to the frame 10 and is biased to exert a downward force on the plate 27 as indicated by the arrow P.

It will be noted in FIG. 2, that the band 28 follows the arc described by the path of the plate 27 when the driving means 15 is moved about its front pivot 17.

Figure 3:
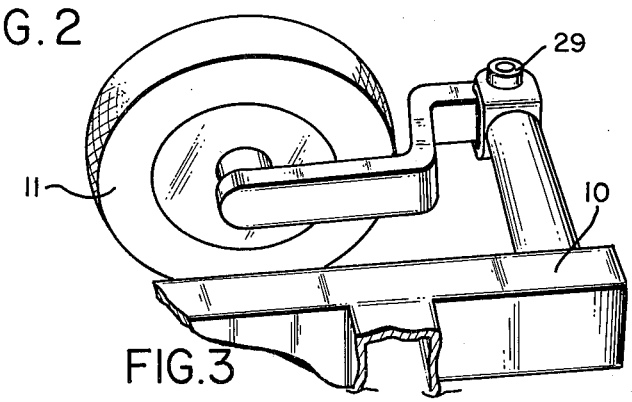
FIG. 3 is a fragmentary view of one of the supporting wheels looking in the direction of the arrows 3—3 of FIG. 1.

FIG. 3 illustrates more clearly the trailing type, caster-camber mounting for the front wheel 11 which is typical for each of the four supporting wheels. Thus, there is provided a turning knuckle 29 located forward of and in the plane of the wheel to define vertical axis about which turning of the wheel takes place. It will be understood, of course, that suitable shock mounts and the like may be provided.

Figure 4:
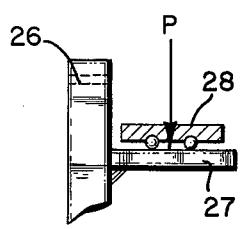
FIG. 4 is a fragmentary view in the direction of the arrows 4—4 of FIG. 2.

FIG. 4 illustrates in greater detail the biasing band 28 and cooperating plate 27 positioned beneath the band so that the downward biasing force P may be applied. Small ball bearings operating in suitable tracks on the underside of the band 28 may be provided on the plate 27 to minimize friction when the driving means is arcuately moved about the pivot point 17.

OPERATION

With particular reference to FIG. 2, the operation of the vehicle will be apparent. As shown, the driving means 15 in the form of the driving wheels 20 and 21 are located ahead of the center of gravity of the vehicle. The center of gravity is indicated at C.G. The force exerted on the vehicle by the driving wheels is applied at the pivot point 17 preferably slightly ahead of the rear portion of the front pair of trailing type caster-camber wheels 11 and 12. This point 17 lies on the longitudinal axis A—A of the vehicle and as a consequence, great stability is assured.

Thus, electrical energy is applied through the power leads 23 to the electric motor 18. If the source of electrical energy on the power leads 23 is provided by a generator 22, it is preferably operated at a constant RPM by the engine 24 so that great efficiency is assured. The amount of power provided by the electric motor 18, its particular RPM, driving torque, braking action, etc., are all electrically controlled by controlling the current supplied to the motor 18.

Steering of the vehicle is accomplished by simply arcuately moving the driving means 15 about the pivot point 17 within the frame 10 such as indicated by the dotted line showing in FIG. 2. It is to be particularly noted that when steering the vehicle, the direction of force applied to the frame at the pivot point 17 is in alignment with the orientation of the driving wheels as shown by the arrow 30. The independently mounted caster-camber type supporting wheels will automatically orient themselves in directions parallel to the orientations of the driving wheels and the direction in which the vehicle is steered, such as indicated by the arrow 31 and the dotted line showings. The four supporting trailing wheels may be attached as in the 1932 Year Model Fiat-type Dubonnet suspension or any other newer type such as used on towed vehicles.

As already explained, the biasing band 28 continuously exerts a force on the rear portion of the coupling member 16 to assure proper traction of the driving wheels 20 and 21 with the ground. In this respect, automatic sensors may be provided to maintain the biasing force substantially constant regardless of the elevation of the independent trailing type caster-camber supporting wheels. While a simple type biasing band has been disclosed, it will be understood that any suitable force applying means, such as a controlled hydraulic system could be utilized so that sensing and proper force application is assured.

It will be evident that the vehicle, as described, eliminates the need for clutches, gear boxes, driving shafts, differential and power transmission to the wheels. Further, the driving wheels 20 and 21 themselves are spaced sufficiently close together than no differential is required between them when steering the vehicle.

From the foregoing, it will thus be seen that the present invention has provided a greatly improved vehicle over conventional vehicle designs presently in operation.

What is claimed is:

1. A vehicle including in combination:
   a. a frame;
   b. front and rear pairs of trailing type caster-camber mounted supporting wheels connected to said frame;
   c. driving wheel means positioned ahead of the center of gravity of the vehicle between said front and rear pairs of wheels; and,
   d. means coupling the driving wheel means to the frame for arcuate movement in a generally horizontal plane through and on either side of the longitudinal center axis of the vehicle within the frame, said arcuate movement taking place about a universal pivot point ahead of the driving means lying on said longitudinal center axis forward of the rearward portions of the front pair of wheels so that a driving force is exerted on the frame at the pivot point through the coupling means in the direction of the orientation of the driving wheel means, the trailing type caster-mounted supporting wheels automatically orienting themselves in a direction parallel to the driving wheel means.

2. A vehicle according to claim 1, in which said driving wheel means includes an electric d.c. motor having a rotor shaft oriented at right angles to the longitudinal axis of the vehicle; and, first and second driving wheels connected directly to the opposite ends of said rotor shaft.

3. A vehicle according to claim 2, including a source of electrical energy connected to said electric motor.

4. A vehicle according to claim 3, in which said source of electrical energy comprises a driving engine arranged to operate at a constant RPM; and an electric generator connected to said engine to be driven thereby to provide electricity to said electric motor.

5. A vehicle according to claim 1, including biasing means on said frame coupled to said driving wheel means at a point spaced from the pivot point exerting a downward biasing force on the driving wheel means to assure desired traction engagement of the driving wheel means with the ground.

* * * * *